(12) United States Patent
Shibata

(10) Patent No.: US 6,422,115 B1
(45) Date of Patent: Jul. 23, 2002

(54) MACHINING TOOLS HAVING WORKPIECE POSITION ADJUSTING DEVICES

(75) Inventor: Yoshinori Shibata, Anjo (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 09/393,711

(22) Filed: Sep. 10, 1999

(30) Foreign Application Priority Data

Sep. 11, 1998 (JP) .......................................... 10-258685

(51) Int. Cl.[7] ................................................. B26D 7/02
(52) U.S. Cl. ...................... 83/464; 83/468.3; 83/471.3; 83/698.41; 269/137; 269/174; 269/208
(58) Field of Search ................................. 83/464, 468.3, 83/471.3, 473, 477.1, 698.41; 269/137, 173, 174, 208

(56) References Cited

U.S. PATENT DOCUMENTS 2,393,764 A * 1/1946 Frank ........................ 269/174
2,758,492 A * 8/1956 Gowing ...................... 269/174
3,734,485 A * 5/1973 Klaus ......................... 269/137
5,417,409 A * 5/1995 Reddell ...................... 269/208
5,437,214 A   8/1995 Sasaki et al. .............. 83/471.3

FOREIGN PATENT DOCUMENTS

JP          1-18287          5/1989

* cited by examiner

Primary Examiner—W. Donald Bray
(74) Attorney, Agent, or Firm—Dennison, Scheiner, Schultz & Wakeman

(57) ABSTRACT

A machine tool includes a table for placing a workpiece thereon and includes a fixing device for fixing the workpiece in position relative to the table. The fixing device may be operable in a first mode for fixing and releasing the workpiece relative to the table and in a second mode for shifting the workpiece relative to the table.

47 Claims, 8 Drawing Sheets

MACHINING TOOLS HAVING WORKPIECE POSITION ADJUSTING DEVICES

BACKGROUND OF THE INVENTION

1. Field of the Invention

The present invention relates to machining tools, such as cutting tools including table saws.

2. Description of the Related Art

A known table saw is shown in FIG. 9 and is operable to cut a workpiece placed on a table. The table saw includes a turntable 101 that is rotatably mounted on a base 100. An operation lever 105 is attached to the turntable 101, so that an operator can rotate the turntable 101 by means of the operation lever 105. The base 100 has a pair of fixed tables 102 disposed on both sides of the turntable 101 substantially in the diametrical direction. Fences 103 are disposed on the fixed tables 102 in line with each other, so that a workpiece W3 can be placed on the turntable 101 and the fixed tables 102 with one side of the workpiece W3 contacting the fences 103. A vertical vice device 110 is provided on one of the fixed tables 102 and is operable to fix the workpiece W3 in position relative to the fixed tables 102 by applying a downward pressing force against the workpiece W3.

A saw unit 104 (shown partly in FIG. 9) is vertically pivotally mounted on the turntable 101 by means of a support 107. The saw unit 104 has a circular saw blade (not shown) mounted thereon and a motor for driving the saw blade, so that the saw blade can rotate within a plane perpendicular to the turntable 101. The turntable 101 has a plate 106 with a blade intrusion slot that permits the blade to enter the turntable 101 below the upper surface of the turntable 101.

In order to cut the workpiece W3, the operator rotates the turntable 101 in either one of directions indicated by an arrow 120 or 121 to a suitable angular position, so that a cut angle of the workpiece W3 can be determined. The operator then places the workpiece W3 on the turntable 101 such that the workpiece W3 extends between the fixed tables 102 with one side of the workpiece W3 contacting the fences 103 as indicated by chain lines in FIG. 9. In order to cut the workpiece W3 along a cut line (not shown) marked on the workpiece, the operator pushes or pulls the workpiece W3 along the fences 103 as indicated by an arrow 122 or 123 so as to register the cut line with the saw blade. Then, the operator operates the vice device 110 so as to fix the workpiece W3 in position relative to the fixed tables 102 and the turntable 103. As a result, the workpiece W3 can be cut along the cut line when the saw unit 104 moves downward.

With the known table saw, the adjustment of position of the workpiece W3 must be performed by directly manually moving the workpiece along the fences. Therefore, it is difficult to make fine adjustments to the position of the workpiece. W3. In addition, the adjustment work is time consuming.

SUMMARY OF THE INVENTION

It is, accordingly, one object of the present invention to teach improved machining tools, in which the positional adjustment of a workpiece can he easily quickly performed.

According to a first aspect of the present invention, a machining tool is taught that includes a table for placing a workpiece thereon, and a fixing device for fixing the workpiece in position relative to the table. The fixing device may be operable in a first node for fixing and releasing the workpiece relative to the table and in a second mode for shifting the workpiece relative to the table. In such a design, the position of the workpiece can be adjusted by operating the fixing device in the second mode, and the workpiece can be fixed in the adjusted position by operating the fixing device in the first mode. As a result, the adjustment of the position of the workpiece can be quickly and reliably performed in comparison with the direct manual adjusting operation of the workpiece.

Preferably, the fixing device is a vice device that can press the workpiece against an abutting member such as a fence. The vice device may have a shaft that is adapted to be rotated about its axis in the first mode and that is adapted to be pivoted within a horizontal plane about a pivotal axis in the second mode.

The shaft of the vice device may have a pad for contacting the workpiece. In the second mode, with the pad pressed against the workpiece to produce an appropriate frictional force between the pad and the workpiece, the shaft may be shifted to move the workpiece along the fence.

Preferably, the pad is movable relative to the shaft in the axial direction of the shaft, and a biasing member is provided between one end of the shaft and the pad so as to resiliently bias the pad toward the workpiece. As a result, during the pivotal movement of the workpiece, an appropriate frictional force may be maintained between the pad and the workpiece, and the pad may reliably contact the workpiece.

According to a second aspect of the present invention, a machining tool is taught that includes a table for placing a workpiece thereon, a base for movably supporting the table, and a shifting device operable in a first mode for fixing and releasing the table relative to the base and operable in a second mode for shifting the table relative to the base. In such a design, with the workpiece placed on the table, the table may be moved relative to base in the second mode of the shifting device. When the workpiece has reached a desired position, the table and the workpiece placed thereon can be fixed in position in the first mode of the shifting device.

Preferably, the shifting device includes an operation member that has a shaft. In the first mode, the shaft may be moved in the axial direction. In the second mode, the shaft may be pivoted about a first axis that extends perpendicular to the axial direction.

Other objects, features and advantages of the present invention will he readily understood after reading the following detailed description together with the accompanying drawings and the claims.

DETAILED DESCRIPTION OF THE INVENTION

Figure 1:
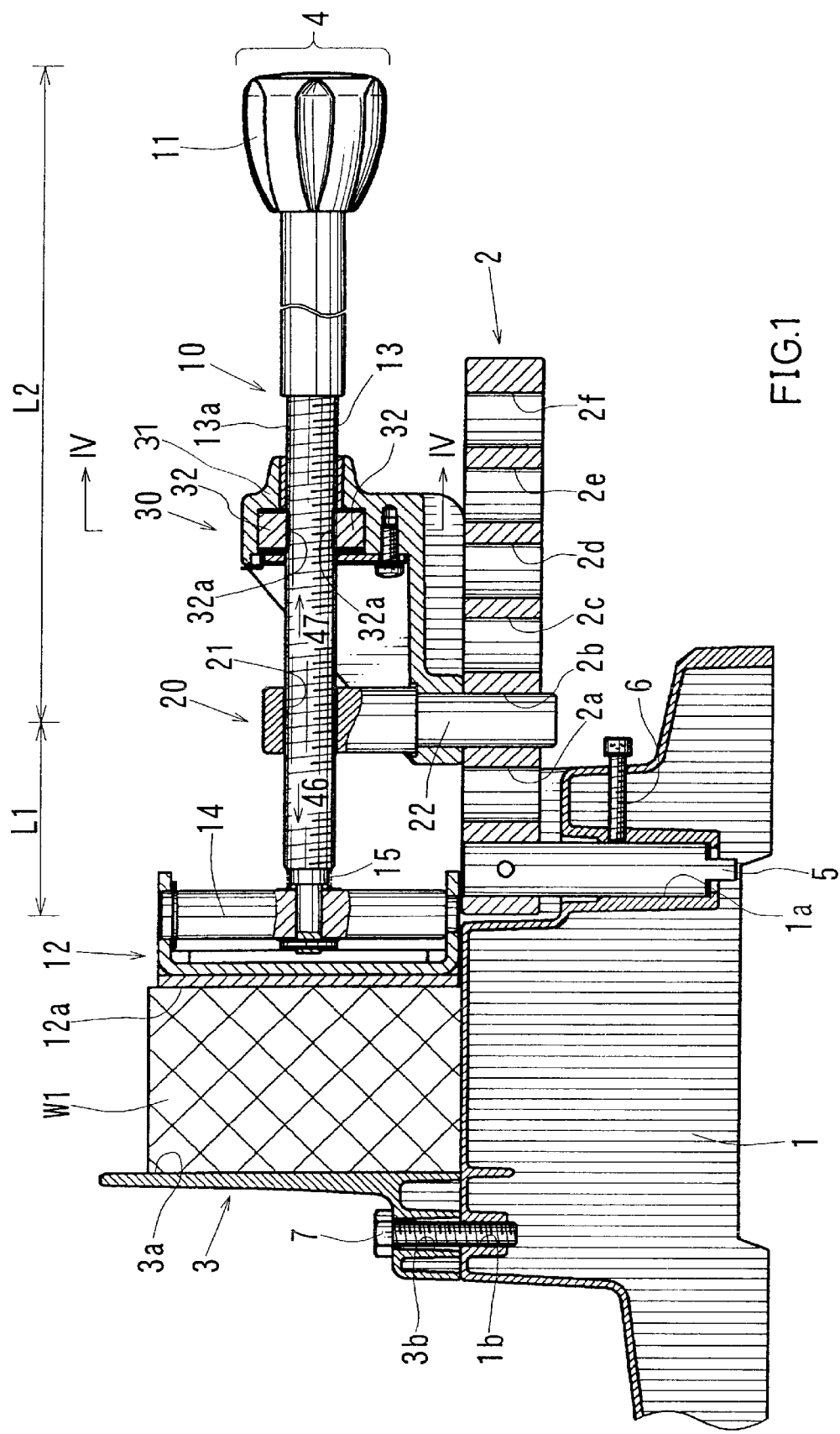
FIG. 1 is a vertical sectional view of a first representative table saw having an improved workpiece fixing device.

Machining tools are taught having a device that can shift a workpiece along a table or that can shift a table with a workpiece.

In one representative embodiment, a machining tool is taught that includes a table for placing a workpiece thereon and a fixing device for fixing the workpiece in position relative to the table. The fixing device may be operable in a first mode for fixing and releasing the workpiece relative to the table and in a second mode for shifting the workpiece relative to the table.

Preferably, the fixing device includes an abutting member and a vice device. The abutting member may be disposed on the table and may have an abutting surface for abutment against one side of the workpiece. The vice device may be operable to press the workpiece against the abutting member in the first mode and to shift the workpiece along the abutting surface of the abutting member in the second mode.

The vice device may include an operation member that is operable by an operator. The operation member may move in a first direction in the first mode and may move in a second direction in the second mode. Preferably, the operation member includes a shaft that moves in an axial direction in the first mode and that pivots about a first axis in the second mode, which first axis extends perpendicular to the axial direction. The first axis may extend substantially perpendicular relative to a plane defined by an upper surface of the table.

The vice device may further include a support member that supports the shaft such that the shaft can move in the axial direction relative to the table and that the shaft can pivot about the first axis.

Preferably, a thread mechanism is provided between the support member and the shaft, so that the shaft moves in the axial direction toward and away from the abutting member as the shaft rotates about a shaft axis. The thread mechanism say include a threaded portion formed on the shaft, and a nut engageable with the threaded portion. The support member may include a retainer for retaining the nut.

The nut may include at least two nut segments that are spaced from each other in the circumferential direction and that can move relative to the retainer in a diametrical direction of the shaft. A nut shifting mechanism may be provided that is operable to shift the nut segments radially inwardly toward the shaft for engagement with the threaded shaft portion and to shift the nut segments radially outwardly away from the shaft for disengagement from the threaded shaft portion.

Preferably, the position of the first axis is adjustable in the axial direction of the shaft.

A pad may be mounted on one end of the shaft and may oppose the workpiece. Preferably, the pad can pivot about a second axis that is parallel to the first axis. In a preferred representative embodiment, the pad can move relative to the shaft in the axial direction of the shaft, and a biasing member is provided between one end of the shaft and the pad so as to resiliently bias the pad toward t he workpiece.

Preferably, the machining tool is a table saw that includes a base and a saw unit The base may serve to support the table, and the saw unit can vertically move relative to the base for cutting the workpiece.

In another representative embodiment, a machining tool is taught that includes a table for placing a workpiece thereon, a base for movably supporting the table, and a shifting device operable in a first mode for fixing and releasing the table relative to the base and operable in a second mode for shifting the table relative to the base.

The shifting device may include an operation member that is operable by an operator and that can move in a first direction in the first mode and can move in a second direction in the second mode. The operation member may include a shaft that can move in an axial direction in the first mode and that can pivot about a first axis, which axis extends perpendicular to the axial direction.

Preferably, a motion conversion mechanism is provided for converting the pivotal movement of the shaft into a liner movement of the table.

Preferably, the shifting device includes a lever plate that is disposed between the table and the base and that can pivot about the first axis relative to the base. The shaft may be mounted on the lever plate and may axially move between a first position for fixing the lever plate in position relative to the base and a second position for releasing the lever plate from the base. The motion conversion mechanism may he provided between the lever plate and the table.

Preferably, the machine tool is a table saw that includes a second table and a saw unit. The second table may be independent of the first table so that the first table is movable toward and away from the second table by the shifting device. The saw unit may vertically move relative to the second table for cutting the workpiece. A second base may be provided for supporting the second table. Preferably, the position of the base is adjustable relative to the second base.

Each of the additional features and method steps disclosed above and below may be utilized separately or in conjunction with other features and method steps to provide improved machining tools and methods for designing and using such machining tools. A representative example of the present invention, which example utilizes many of these additional features and method steps in conjunction, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particular describe some representative examples of the invention.

Figure 9:
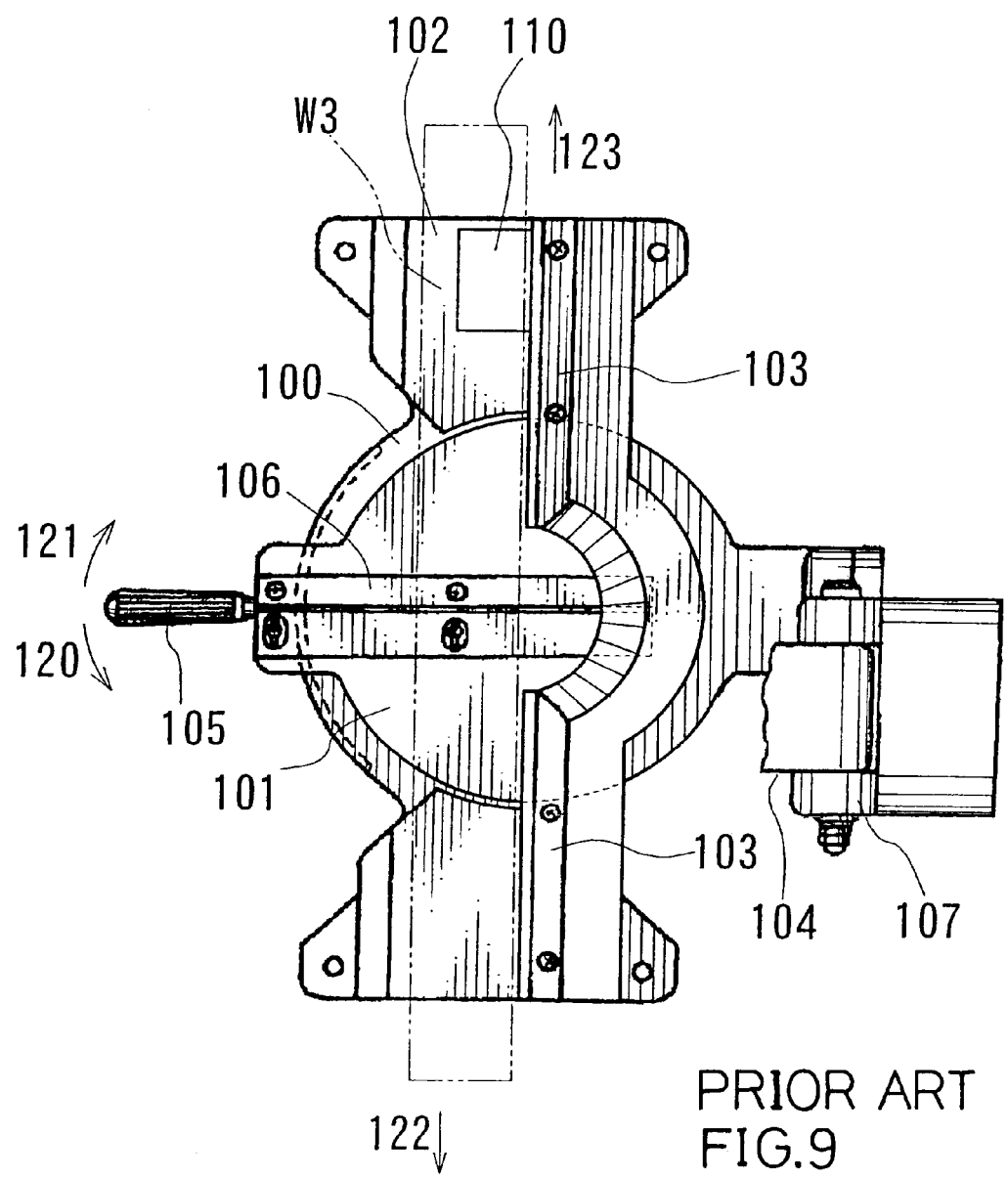
FIG. 9 is a plan view of a known table saw.

A machining tool according to a first representative embodiment is shown in FIGS. 1–5, which in this representative embodiment is a table saw. The machine tool of this representative embodiment may have substantially the same construction as the known table saw described in connection with FIG. 9, excluding a vice device 4 and various mechanisms associated with the vice device 4.

Thus, the machine tool may include a base 150 that rotatably supports a turntable 151. The base 150 may have a pair of fixed tables 1 (one shown in FIG. 2) that are disposed on both sides of the turntable 151 in the diametrical direction. A fence 3 may be fixedly mounted on each of the fixed tables 1 by means of bolts 7. The bolts 7 may be inserted into insertion holes 3b formed in the fence 3 and may engage threaded holes 1b formed in the corresponding fixed table 1.

The vice device 4 may be disposed on one of the fixed tables 1 on the rear side of the corresponding fence 3 and may include a vice support 2. The vice support 2 may have a support shaft 5 that is inserted into an insertion hole 1a formed in the fixed table 1 and that is fixed in position by means of a bolt 6.

A vice device 4 may be mounted on the vice support 2 and may include a horizontal vice shaft 100 an upright pivotal support 20, and a vice member 30. A knob 11 may be mounted on the rear end of the vice shaft 10 for operation by an operator. A pad 12 may be mounted on the front end of the vice shaft 10 and may be adapted to be pressed against a workpiece W1 so as to fix the workpiece W1 in position between a side surface 3a of the fence 3 and a front surface 12a of the pad 12.

The vice shaft 10 may be axially movably inserted into a horizontal insertion hole 21 that is formed in the pivotal support 20. The vice shaft 10 also may be inserted into a holder 31 of the vice member 30. The vice shaft 10 may include a threaded shaft portion 13a that is engageable with threaded inner surfaces 32a of a pair of nut segments 32. The nut segments 32 may be held within the holder 31 and may be shiftable in the radial direction of the vice shaft 10, 50 that the threaded inner surfaces 32a can engage and disengage from the threaded shaft portion 13a. Therefore, when the threaded inner surfaces 32a engage the threaded shaft portion 13a, the vice shaft 30 can forcibly move in the axial direction as indicated by arrows 46 and 47 as the vice shaft 30 rotates about its axis. When the threaded inner surfaces 32a are disengaged from the threaded shaft portion 13a, the vice shaft 30 is free to move in the axial direction as indicated by arrows 46 and 47.

Figure 2:
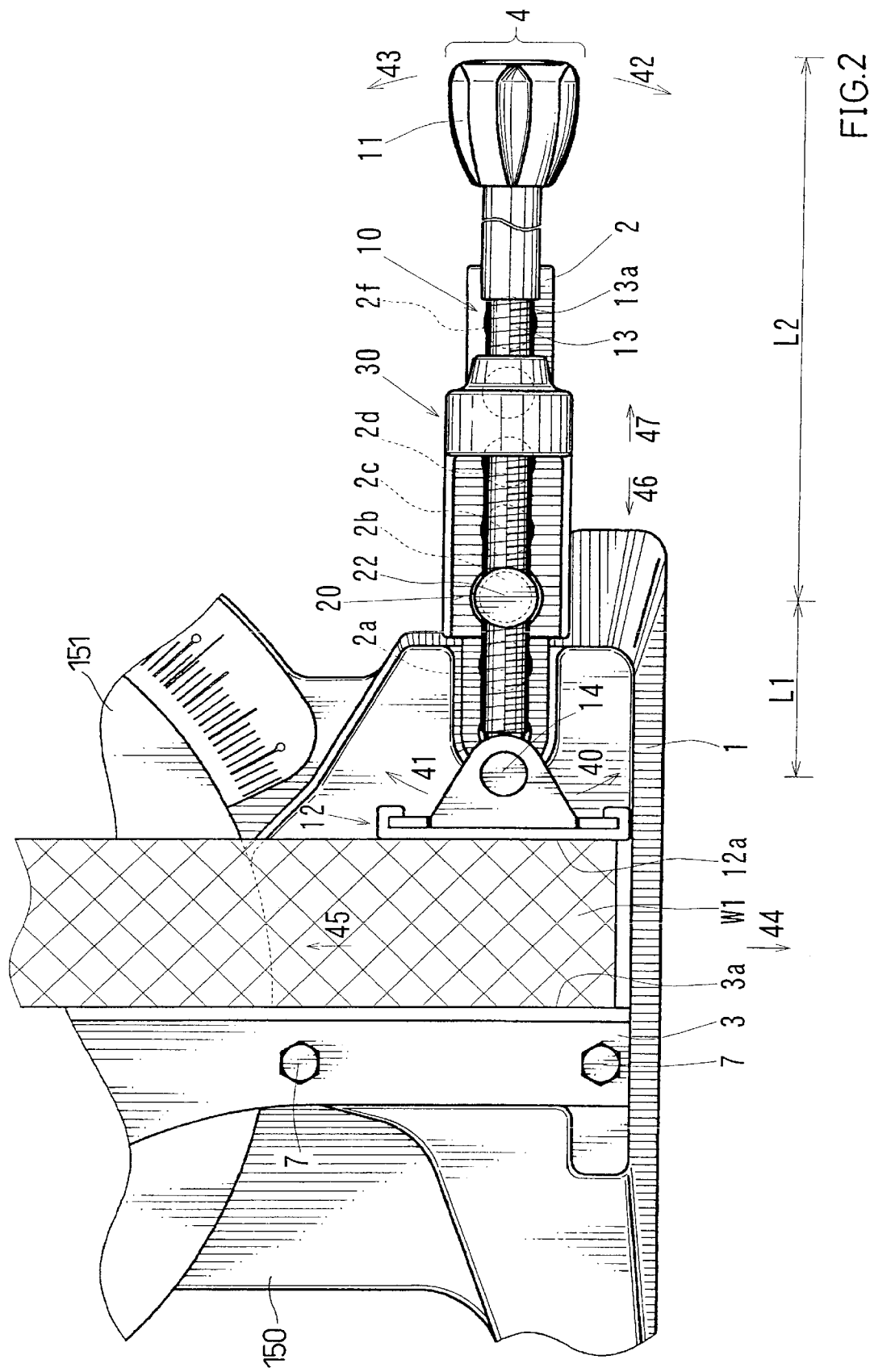
FIG. 2 is a plan view of FIG. 1.

The pad 12 may be connected to the front end of the vice shaft 10 by means of a pivot pin 14, so that the pad 12 can pivot relative to the vice shaft 10 within tile horizontal plane as indicated by arrows 40 and 41 in FIG. 2. In addition, the pin 14 may be mounted on the front end of the vice shaft 10 such that it is axially slidably movable relative to the vice shaft 10 within a predetermined small range. A spring 15 may fitted on the vice shaft 10 so as to bias the pin 14 in the forward direction or the direction to push the pad 12 toward the face 3. The pivotal support 20 may have an insertion pin 22 that is selectively insertable into any of a plurality of vertical pin receiving holes 2a to 2f formed in the vice support 2. As a result, the position of the pivotal axis of the vice shaft 10 can be changed in the axial direction of the vice shaft 10.

The holder 31 of the vice member 30 may be fixed to the insertion pin 22 or may be rotatably fitted on the insertion pin 22. In any event, the holder 31 may pivot with the insertion pin 22 relative to the vice support 2. In addition, when the insertion pin 22 is removed from any of the pin receiving holes 2a to 2f, the vice member 30 also can be removed from the vice support 2.

Figure 3:
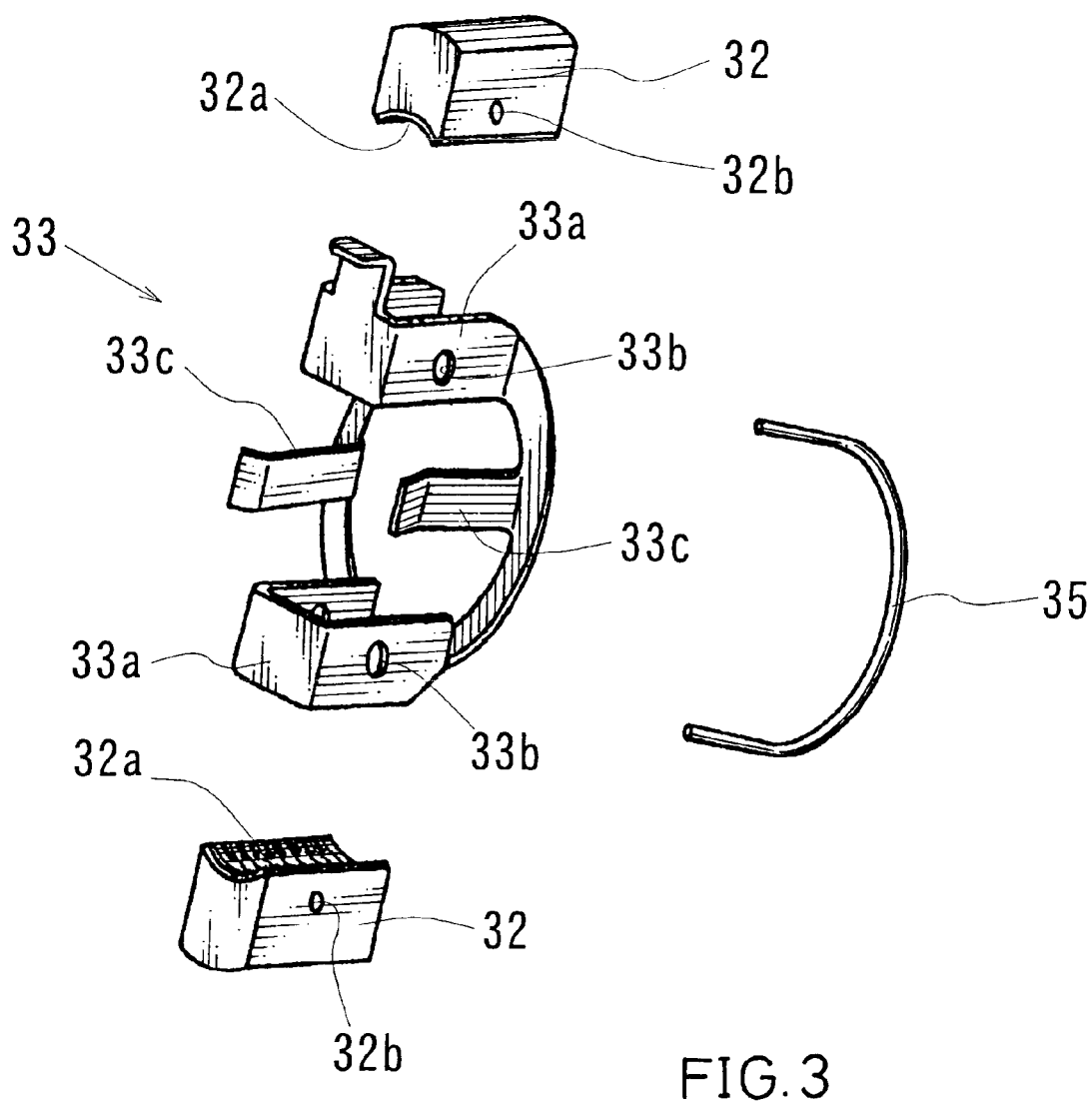
FIG. 3 is an exploded perspective view of a nut retainer and nut segments.

The vice member 30 will be further explained with reference to FIGS. 3 to 5. The vice member 30 may include a nut retainer 33 and a substantially U-shaped wire spring 35 in addition to the holder 31 and the nut segments 32.

The holder 31 may have an axial recess 36 for receiving the nut retainer 33 and the nut segments 32. The axial recess 36 may have an inner peripheral surface that is formed with a pair of cam surfaces 37 and 38. As shown in FIGS. 4 and 5, the cam surfaces 37 and 38 may oppose to each other substantially in the diametrical direction. Each of the cam surfaces 37 and 38 may have a radius that varies in the circumferential direction of the axial recess, 36, so that radius L3 of the axial recess 36 along line Y—Y is smaller than radius L4 along line X—X.

Each of the nut segments 32 may have an outer surface that can slidably contact the corresponding cam surface 37 or 38. In addition, each of the nut segments 32 may have lateral surfaces on both sides in the circumferential direction, one of which lateral surfaces may include an engaging hole 32b for engaging corresponding one end of the wire spring 35.

The nut retainer 33 may have a substantially ring-like configuration and may include a pair of support portions 33a. The support portions 33a are positioned opposite each other in the diametrical direction of the nut retainer 33 and serve to support the nut segments 32 such that the nut segments 32 are slidably movable in the radial direction. Each of the support portions 33a may have an insertion bole 33b for receiving the respective end of the wire spring 35. Thus, both ends of the wire spring 35 are inserted into the insertion holes 33b of the support portions 33a and are then engaged with the engaging holes 32b of the nut segments 32. The insertion holes 33b may have a diameter greater than the diameter of the engaging holes 32b or the wire spring 35, which spring applies a biasing force to the nut segments 32 to urge them away from each other in the diametrical direction. As a result, the nut segments 32 may be held to contact the cam surfaces 37 and 38 while they can move in the diametrical direction within the range of the diameter of the insertion holes 33b.

The nut retainer 33 may further include a pair of clamp members 33c that oppose to each other in the diametrical direction and that are displaced from the support portions 33a by an angle of 90° in the circumferential direction. The clamp member 33c may serve to clamp the vice shaft 10 from both sides in the diametrical direction, so that the nut retainer 33 can rotate with the vice shaft 10 by the frictional force.

Figure 4:
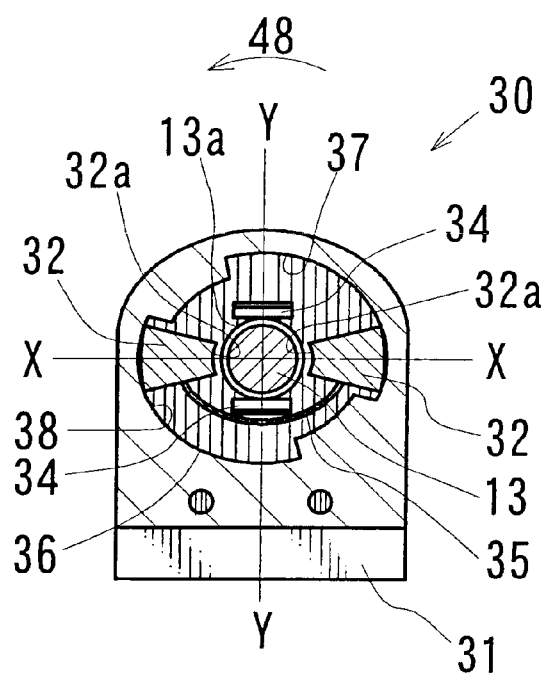
FIG. 4 is a vertical sectional view of a vice holder.

Therefore, when the nut segments 32 are positioned on line X—X shown in FIG. 4, the threaded inner surfaces 32a of the nut segments 32 are disengaged from the threaded shaft portion 13a of the vice shaft 10, so that the vice shaft 10 is free to move in the direction indicated by arrows 46 and 47 in FIG. 1. As the vice shaft 10 rotates in a direction indicated by an arrow 48 in FIG. 4, the nut retainer 33 with the nut segments 32 rotates in the same direction, so that the nut segments 32 move along the cam surfaces 37 and 38, respectively. As a result, the nut segments 32 move radially inward toward the vice shaft 10. When the nut segments 32 reach the position on line Y—Y shown in FIG. 5, in which the nut segments 32 are prevented from moving further in the direction of arrow 48, the threaded inner surfaces 32a engage the threaded shaft portion 13a. As the vice shaft 10 further rotates, the vice shaft 10 moves axially rearward in the direction of arrow 46 in FIG. 1 through engagement between the threaded shaft portion 13a and the threaded inner surfaces 32a of the nut segments 32, so that the workpiece W1 can be clamped between the pad 12 and the fence 3.

Figure 5:
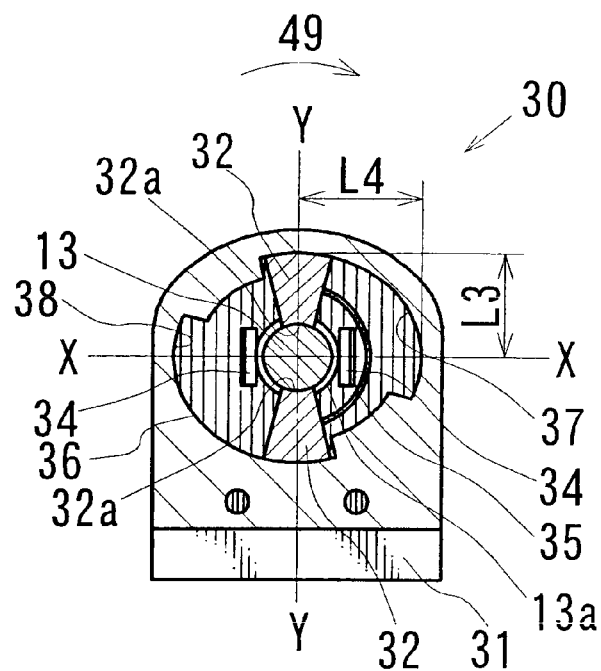
FIG. 5 is a vertical sectional view similar to FIG. 4 but showing the different operation of the nut segments.

On the other hand, when the vice shaft 10 rotates in the direction of arrow 49 in FIG. 5 in the state shown in FIG. 5, the vice shaft 10 may move axially forwardly in the direction indicated by arrow 47 in FIG. 1 through engagement between the threaded shaft portion 13a and the threaded inner surfaces 32a of the nut segments 32. At the same time, the nut retainer 33 may rotate in the same direction as the vice shift 10 to return to the position shown in FIG. 4. As a result, the nut segments 32 may be disengaged from the threaded shaft portion 13a.

The operation of the above representative embodiment will now be explained. First, the operator inserts the insertion pin 22 of the pivotal support 20 into any one of the pin receiving holes 2a to 2f of the vice support 2. The pin receiving hole 2a–2f that receives the insertion pin 22 may be chosen in accordance with the size of the workpiece W1 to be clamped. Moreover, the pin receiving hole 2a–2f that receives the insertion pin 22 may be chosen in accordance with a desired pivotal distance of the pad 12 about the vice support 2 or a desired ratio of a distance L2 between the front end of the knob 11 and the pivotal support 20 to a distance L1 between the pivot pin 14 and the pivotal support 20 (see FIG. 1). Thus, if the knob 11 is shifted by the same distance, the pivotal movement of the pin 14 or the pad 12 will decrease as the ratio L1/L2 decreases. As a result, the position of the pad 12 can be finely adjusted.

Then, the operator places the workpiece W1 on the fixed tables 1 such that one side of the workpiece W1 contacts the fences 3. At this time, the position of the workpiece W1 in the longitudinal direction may be roughly determined.

In order to finely adjust the position of the workpiece W1 in the longitudinal direction with the nut segments 32 in a position shown in FIG. 4, the operator axially moves the vice shaft 10, so as to slightly press the pad 12 against the other side of the workpiece W1 with the spring 15 compressed.

Then, the operator pivots the vice shaft 10 about the pivotal support 20 in either of the directions indicated by arrows 42 and 43 in FIG. 2. As described above, the pad 12 can pivot relative to the vice shaft 10 about the pin 14, and the pad 12 is biased by the spring 15 toward the workpiece W1.

Therefore, as the vice shaft 10 pivots in the direction of arrow 42 or 43, the workpiece W1 will follow such pivotal movement of the vice shaft 10 so as to shift along the fences 3 in the longitudinal direction due to the frictional force between the other side of the workpiece W1 and the front end 12a of the pad 12. As a result, the workpiece W1 can be precisely positioned such that a circular saw blade of a saw unit (not shown) registers with a cut mark (not shown) marked on the workpiece W1. The shiftable amount of the workpiece W1 can be appropriately determined by choosing any one of the pin receiving holes 2a to 2f, into which the pivot pin 22 of the pivotal support 20 is inserted. If the frictional force between the front end 12a of the pad and the workpiece W1 is too great or too small, the workpiece W1 cannot move with the pad 12. However, because the spring 15 is provided in this representative embodiment, the frictional force can be suitably determined by selecting a spring that has an appropriate spring force. In addition, irrespective of changes in the position of the pad 12 in the pivotal direction, the pad 12 can still apply an appropriate pressing force against the workpiece W1 for shifting the workpiece W1 to follow the pivotal movement of the vice shaft 10.

After the fine adjustment of the workpiece W1 in the longitudinal direction, the operator rotates the vice shaft 10 about its axial to move the same in the axial direction toward the workpiece W1, so that the workpiece W1 can be fixedly clamped between the fences 3 and the pad 12 with the spring 15 completely compressed.

According to the above first representative embodiment, the position of the workpiece W1 in the longitudinal direction can be precisely adjusted by pivoting the vice shaft 10 about the pivotal support 20. Therefore, in comparison with the conventional adjusting operation, in which the workpiece is direct manually shifted by the operator, the adjusting operation utilizing this representative embodiment can be easily quickly performed.

In addition, because the pad 12 for clamping the workpiece W1 in position is utilized also for shifting the workpiece W1, the table saw may have a simple construction.

Further, by choosing the ratio of the distance L2 between the front end of the knob 11 and the pivotal support 20 to the distance L1 between the pivot pin 14 and the pivotal support 20, (see FIG. 1), the shiftable range of the pad 12 or the workpiece W1 can be adjusted.

Furthermore, because of the provision of the pin 14 and the spring 15 between the pad 12 and the vice shaft 10, the pressure against the workpiece W1 can be appropriately maintained during the operation for adjusting the position of the workpiece W1.

Although, a device is provided for moving the nut segments 32 to engage and disengage the threaded shaft portion 13 in the above representative embodiment, such a device may be omitted. Thus, the nut segments may be replaced with a single nut that is fixedly held by the nut retainer 31.

In addition, although the vice shaft 10 is supported by the pivotal support 20 and the vice member 30 in the above representative embodiment, the vice shaft 10 may be supported only by the vice member 30. Thus, the pivotal support 20 may be configured without its upper part including the insertion hole 21.

Further, the pin 22 and the pin receiving holes 2a to 2f may have cylindrical configurations or any other configurations as long as the pin 22 is rotatable within the pin receiving holes. In addition, the number of the pin receiving holes may be selectively determined.

Furthermore, a vertical vice Or a horizontal vice having a known construction may be provided on the other fixed table 1 that is positioned on the side opposite to the fixed table 1, on which the vice device 4 is provided, so that the workpiece W1 can be fixed in position on both sides of the turntable 151.

Furthermore, although the vice member 30 is mounted on the fixed table 1 by means of the vice support 2 in the above representative embodiment, the vice support 2 may be omitted.

Thus, the pin receiving holes 2a to 2f may be formed in the fixed table 1, so that the vice member 30 can be directly mounted on the fixed table 1.

Figure 6:
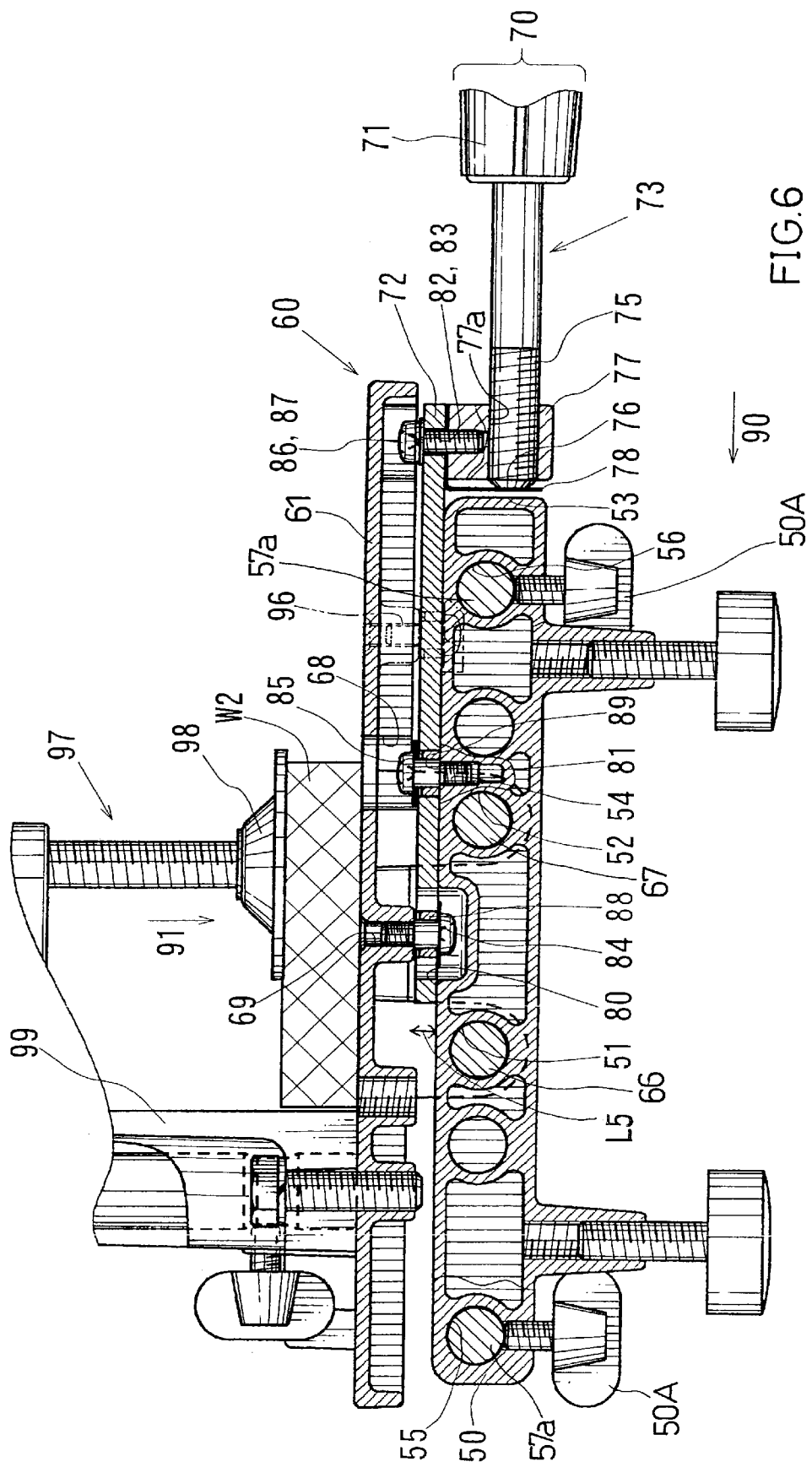
FIG. 6 is a vertical sectional view of a second representative table saw having an improved workpiece shifting device.
Figure 7:
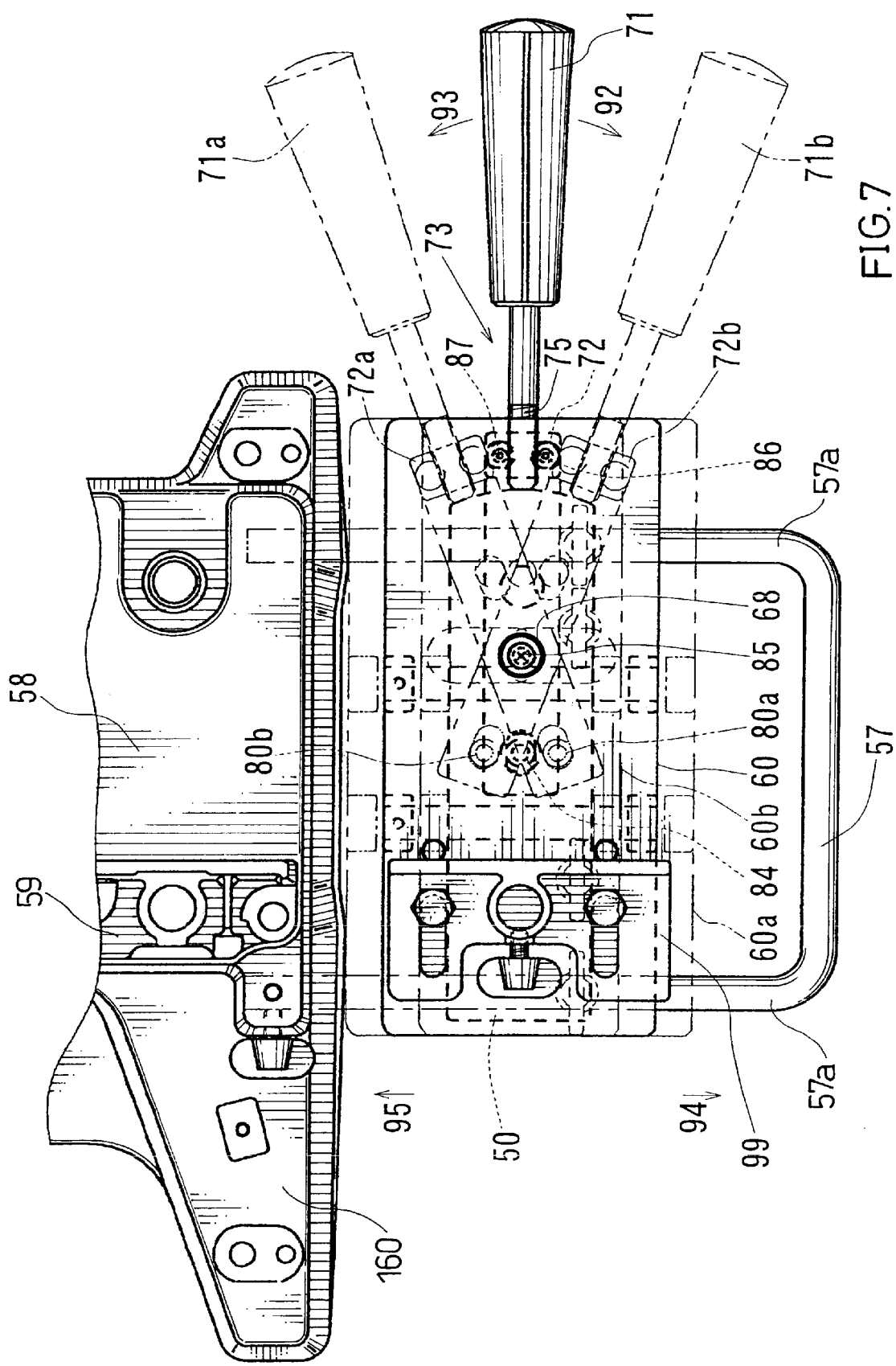
FIG. 7 is a plan view of FIG. 6.
Figure 8:
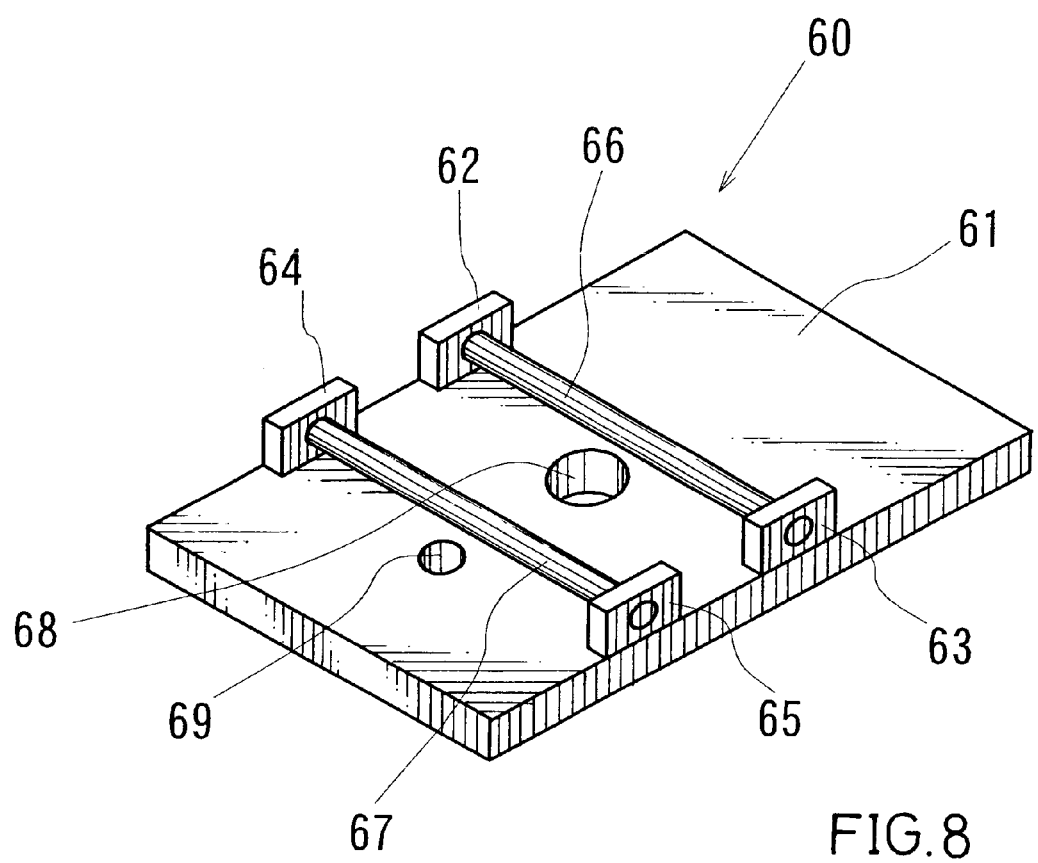
FIG. 8 is a perspective view of an auxiliary table.

A machining tool according to a second representative embodiment is shown in FIGS. 6–8, which in this representative embodiment also is a table saw. The machine tool of this representative embodiment may have substantially the same construction as the known table saw described in connection with FIG. 9, excluding an auxiliary base 50, an auxiliary table 58, a vice device 97 and their associated parts and mechanisms.

Thus, the machine tool may include a base 160 that rotatably supports a turntable (not shown). The base 160 may have a pair of fixed tables 58 (one shown in FIG. 7) that are disposed on both sides of the turntable in the diametrical direction. A fence 59 may be fixedly mounted on each of the fixed tables 58 by means of bolts.

The auxiliary base 50 may be mounted on one of the fixed tables 58 by means of a support arm 57. The support arm 57 may have a substantially U-shaped configuration in plan view and may include a pair of parallel horizontal arm portions 57a that are connected to the fixed table 58 and that are slidably inserted into a pair of parallel horizontal holes 55 and 56 formed in the auxiliary base 50. The auxiliary base 50 may be fixed in position relative to the support arm 57 by Means of screws 50A.

An auxiliary table 60 may be disposed above the auxiliary base 50 and may be shifted relative to the auxiliary base 50 by means of a shifting device 70. The vice device 97 may have a pad 98 and may be mounted on the auxiliary table 60, so that the pad 98 can downwardly press a workpiece W2 against the auxiliary table 60 so as to fix the workpiece W2 in position on the auxiliary table 60. An auxiliary fence 99 may be mounted on the auxiliary table 60, so that the workpiece W2 can be fixed in position relative to the auxiliary table 60 with one side of the workpiece W2 contacting the auxiliary fence 99. The vice device 97 may be a vertical vice and may have a construction that is the same as known vertical vices.

Another known horizontal or vertical vice device (not shown) may be mounted on the fixed table 58 that is positioned adjacent the auxiliary table 60 or on the other fixed table 58 that is positioned on the opposite side.

As shown in FIG. 8, the auxiliary table 60 may include a top plate 61 and a pair of parallel support rods 66 and 67 that art joined to the top plate 61 in spaced relationship therewith by means of tabs 62 and 63 and tabs 64 and 65, respectively. The support rods 66 and 67 may be slidably inserted into horizontal support holes 51 and 52 formed in the auxiliary base 50, respectively, so that the auxiliary table 60 can slidably move relative to the auxiliary base 50 in a direction indicated by arrow 94 or 95 in FIG. 7. A vertical central hole 68 and a threaded hole 69 may be formed in the top plate 61.

As shown in FIG. 6, a screw 84 may engage the threaded hole 69. A sleeve 88 may be fitted on the screw 84 and may be interposed between the head of the screw 84 and the lower side of the top plate 61.

The shifting device 70 may include a lever plate 72, a shaft 73, a lever block 77 and a lock plate 78.

A knob 71 for operation by the operator may be mounted on the rear end of the shaft 73. The other end of the shaft 73 may have a threaded shaft portion 75.

The lever block 77 may have a threaded hole 77a that engages the threaded shaft portion 75 of the shaft 73. The lever block 77 may be fixedly connected to the lever plate 72 by means of screws 86 and 87. The lock plate 78 may have a substantially inverted L-shaped configuration and may include an upper horizontal portion and a lower vertical portion that may resiliently deform. The horizontal portion of the lock plate 78 may be clamped between the lever plate 72 and the lever block 77, so that the vertical portion opposes the front end 76 of the threaded portion 75 of the shaft 73 on one side and opposes a rear end surface 53 of the auxiliary base 50 on the other side. The rear end surface 53 of the auxiliary base 50 may have an arc-shaped configuration in plan view.

The lever plate 72 may have a first hole 80 that has a configuration elongated in the lengthwise direction of the lever plate 72 so as to slidably receive the screw 69 at the sleeve 88. A screw 85 may be inserted into an insertion hole 81 formed in the lever plate 72 and may engage a threaded hole 54 formed in the auxiliary base 50. A sleeve 89 may be fitted on the screw 85 and may be slidably inserted into the insertion hole 81, so that the lever plate 72 can vertically pivot about the screw 85. The central hole 68 of the top plate 61 may be positioned above the screw 85, so that the screw 85 can be easily tightened by inserting a screwdriver into the central hole 68.

The screws 84 and 85 may be configured as stepped screws, and length L5 of the shank parts of the screws 84 and 85, on which the sleeves 88 and 89 are fitted, respectively, may be slightly greater than the thickness of the lever plate 72. As a result, the lever plate 72 is not fixed in position relative to the auxiliary table 60 when the screw 84 has been tightened. In addition, the lever plate 72 is not fixed in position relative to the auxiliary base 50 when the screw 85 has been tightened. Further, because of the provision of the sleeves 88 and 89, the lever plate 72 can smoothly move relative to both the auxiliary table 60 and the auxiliary base 50.

With this construction, when the operator pivots the shaft 73 of the lever block 77 by means of the knob 71 within the horizontal plane in a direction as indicated by arrow 92 or 93, the lever plate 72 may pivot about the screw 85 relative to the auxiliary base 50 to a position as indicated by chain lines 72a or 72b in FIG. 7. Therefore, through engagement of the screw 84 with the elongated hole 80 by means of the sleeve 89, the auxiliary table 60 can move along the parallel horizontal arm portions 57a of the support arm 57 in a direction indicated by arrow 94 or 95 to a position as indicated by chain lines 60a or 60b. Thus, the pivotal movement of the shaft 73 can be converted into a linear movement of the auxiliary table 60.

The operation of the second representative embodiment will now be explained.

In order to fix the auxiliary table 60 in position relative to the auxiliary base 50, the operator rotates the shaft 73 in a clockwise direction by means of the knob 71, so that the shaft 73 moves forward relative to the lever block 77 or the lever plate 72 as indicated by arrow 90 in FIG. 6 through engagement with the threaded portion 75 of the shaft 73 and the threaded hole 77a formed in the lever block 77. Therefore, the vertical portion of the lock plate 78 may be pressed by the shaft 73 to be resiliently deformed toward the rear end surface 53 of the auxiliary base 50. As a result, the lock plate 78 may he pressed against the rear end surface 53, so that the auxiliary table 60 can be fixed in position relative to the auxiliary base 50.

In order to precisely fix the workpiece W2 in a desired position relative to the fixed tables 58, the operator places the workpiece W2 on the fixed tables 58 such that one side of the workpiece W2 contacts the fences 59 and 99. At this time, the position of the workpiece W2 in the longitudinal direction may be roughly determined.

Then, the operator operates the vice device 97 to lower the pad 98 as indicated by arrow 91 in FIG. 6 so as to fix the workpiece W2 in position relative to the auxiliary table 60. Thereafter, the operator rotates the shaft 73 in the counter-clockwise direction so as to release the lock stale of the auxiliary table 60 relative to the auxiliary base 50.

Subsequently, the operator pivots the shaft 73 in either of the directions indicated by arrows 92 and 93 to shift the auxiliary table 60 in either of the directions indicated by arrows 94 and 95. Therefore, the workpiece W2 moves relative to the fixed bases 58 along the fences 591 so that a fine adjustment of the position of the workpiece W2 can be performed.

When the workpiece W2 has moved to a desired position for the cutting operation, the operator rotates the shaft 73 in the clockwise direction to again lock the auxiliary table 60 to the auxiliary base 50.

The lever ratio of the lever plate 72 can be determined by changing the position of the screw 84 relative to the top plate 61 and the position of the elongated hole 80 of lever plate 72. For example, the position of the screw 84 may be changed to the position as indicated by chain lines 96 in FIG. 6, so that the shiftable range of the auxiliary table 60 can be reduced. In addition, the moving direction of the auxiliary table 60 may be the same direction as the pivotal movement of the shaft 73. Thus, the lever ratio of the lever plate 72 may be suitably determined according to a desired shiftable amount of the auxiliary table 60.

Finally, the operator operates the vice device mounted on the fixed table 58. This vice device may be positioned adjacent the fixed table 58 having the auxiliary table 60 or the other fixed table 58 on the opposite side. As a result, the workpiece W2 can be fixed in the desired position while it is clamped at two positions spaced in the longitudinal direction.

According to the second representative embodiment, the operation for fine adjustment of position of the workpiece W2 can be quickly and precisely performed as in the first representative embodiment.

The above second representative embodiment may be modified in various ways. For example, the mechanism for moving the auxiliary table 60 relative to the fixed table 50 may be any other mechanism than the mechanism disclosed in this representative embodiment as long as it can shift the auxiliary table 60 toward and away from the fixed table 58 in response to the pivotal movement of the shaft 73. In addition, a motor may be incorporated to move the auxiliary table 60.

What is claimed is:

1. A machine tool comprising:
   a table having a fence extending substantially perpendicular from an upper surface of the table, the fence and table being adapted to support a workpiece and a fixing device comprising a vice that is operable in a first mode to fix the workpiece relative to the table and fence and is operable in a second mode to shift the workpiece within a plane that is substantially parallel to the fence.

2. A machine tool as defined in claim 1, further comprising an operation member that is operable to shift the workpiece within the plane that is substantially parallel to the fence, the operation member pivoting about a first axis in the second mode, wherein the first axis is substantially perpendicular to the upper surface of the table.

3. A machine tool as defined in claim 2, wherein the operation member includes a shaft, wherein the shaft moves along an axial direction of the shaft in the first mode, wherein the axial direction of the shaft is substantially perpendicular to the plane that is substantially parallel to the fence.

4. A machine tool as defined in claim 3, further comprising a support member that supports the shaft, such that the shaft is movable in the axial direction relative to the table and the shaft is pivotable about the first axis.

5. A machine tool as defined in claim 4, wherein the support member defines the first axis and the position of the first axis relative to the table is adjustable along the axial direction of the shaft.

6. A machine tool as defined in claim 5, further including a thread mechanism disposed between the support member and the shaft, so that the shaft can move in the axial direction toward and away from the fence as the shaft rotates about a shaft axis.

7. A machine tool as defined in claim 6, wherein the thread mechanism includes a threaded portion formed on the shaft and a nut engageable with the threaded portion, wherein the support member further includes a retainer for retaining the nut.

8. A machine tool as defined in claim 7, wherein the nut includes a plurality of nut segments that are spaced from each other in the circumferential direction and are movable relative to the retainer in a diametrical direction of the shaft, and further including a nut shifting mechanism that is operable to shift the nut segments radially inwardly toward the shaft for engagement with the threaded shaft portion and to shift the nut segments radially outwardly away from the shaft for disengagement from the threaded shaft portion.

9. A machine tool as defined in claim 3, further including a pad mounted on one end of the shaft and opposing the workpiece, the pad being pivotable about a second axis that is substantially parallel to the first axis.

10. A machine tool as defined in claim 9, further comprising a biasing member disposed between the shaft and the pad so as to resiliently bias the pad toward the workpiece.

11. A machine tool as defined in claim 10, wherein the position of the first axis is adjustable along the axial direction of the shaft.

12. A machine tool as defined in claim 1, wherein the machine tool is a table saw, and further comprises a base, a turntable and a saw unit, the base rotatably supporting the turntable and the saw unit being vertically movable relative to the turntable for cutting the workpiece.

13. A machining tool as defined in claim 1, further comprising an auxiliary table that is laterally displaceable relative to the table, wherein the vice is disposed on the auxiliary table.

14. A machine tool as defined in claim 13, further comprising an operation member that is operable to shift the workpiece within the plane that is substantially parallel to the fence, the operation member being coupled to the auxiliary table and pivoting about a first axis in the second mode, wherein the first axis is substantially perpendicular to the upper surface of the table.

15. A machine tool as defined in claim 14, wherein the operation member includes a shaft, wherein the shaft moves in an axial direction of the shaft in order to fix the position of the auxiliary table with respect to the table, wherein the axial direction of the shaft is substantially parallel to the upper surface of the table.

16. A machine tool as defined in claim 15, further including a motion conversion mechanism for converting pivotal movement of the shaft into lateral movement of the auxiliary table with respect to the table.

17. A machine tool as defined in claim 16, further comprising an auxiliary base and a lever plate that is disposed between the auxiliary base and the auxiliary table, wherein the shaft, lever plate and auxiliary base are pivotable relative to the auxiliary table about the first axis, the shaft being axially movable between a first position for fixing the lever plate in position relative to the auxiliary base and a second position for releasing the lever plate from the auxiliary base, wherein the motion conversion mechanism is disposed between the lever plate and the auxiliary base.

18. A machine tool as defined in claim 13, wherein the machine tool is a table saw, and further comprises a base, a turntable and a saw unit, the base rotatably supporting the turntable and the saw unit being vertically movable relative to the turntable for cutting the workpiece.

19. A machine tool as defined in claim 13, wherein the machine tool is a table saw and further comprises a saw unit that is vertically movable relative to the table for cutting the workpiece.

20. A machine tool as defined in claim 19, wherein the vice comprises a pad and the workpiece can be fixed between the pad and the upper surface of the auxiliary table.

21. A machine tool comprising:
   a table having an upper surface defining a first plane that is adapted to support a workpiece,
   a fence disposed on the table and having a side surface defining a second plane, the second plane being substantially perpendicular to the first plane,
   first means for fixing the position of the workpiece during operation of the machine tool and
   second means for finely adjusting the position of the workpiece within a plane substantially parallel to the second plane after the workpiece has been temporarily fixed by the first means.

22. A machine tool as in claim 21, wherein the second means comprises a shaft that can move axially and can pivot about a first axis that is substantially perpendicular to the first plane.

23. A machine tool as in claim 22, wherein the first means comprises a vice.

24. A machine tool as in claim 23, wherein the vice pushes the workpiece against the fence in order to fix the position of the workpiece.

25. A machine tool as in claim 23, wherein the second means comprises a support member for supporting the shaft, wherein the support member defines the first axis and the position of the first axis is adjustable relative to the table.

26. A machine tool as in claim 23, wherein the vice comprises a pad for contacting the workpiece, wherein the pad is pivotable about a second axis that is substantially parallel to the first axis.

27. A machine tool as in claim 23, further comprising an auxiliary table that is laterally displaceable relative to the table, the vice is mounted on the auxiliary table and the vice pushes the workpiece against the upper surface of the table in order to fix the position of the workpiece.

28. A machine tool as in claim 26, wherein the second means comprises means for converting pivotal movement of the shaft into lateral movement of the auxiliary table relative to the table.

29. A machine tool comprising:
a fixed table having an upper surface defining a first plane that is adapted to support a workpiece,
a fence disposed on the table and having a side surface defining a second plane, the second plane being substantially perpendicular to the first plane,
an auxiliary table having an upper surface disposed within the first plane that is adapted to support the workpiece and
means for shifting the auxiliary table relative to the fixed table in order to finely adjust the position of the workpiece.

30. A machine tool as in claim 29, further comprising a vice disposed on the auxiliary table, the vice comprising a pad and the vice being operable to fix the workpiece between the pad and the upper surface of the auxiliary table, wherein the shifting means finely adjusts a longitudinal position of the workpiece along a plane substantially parallel to the second plane after the workpiece has been temporarily fixed by the vice.

31. A machine tool as in claim 29, wherein the shifting means comprises a shaft that moves axially to fix the position of the auxiliary table relative to the table and pivots about a first axis that is substantially perpendicular to the first plane in order to laterally displace the auxiliary table relative to the table.

32. A machine tool as defined in claim 31, wherein the shifting means further comprises a motion conversion mechanism for converting pivotal movement of the shaft into lateral movement of the auxiliary table with respect to the table.

33. A machine tool as defined in claim 32, wherein the shifting means further comprises a lever plate that is disposed between an auxiliary base and the auxiliary table, wherein the shaft, lever plate and auxiliary base are pivotable relative to the auxiliary table about the first axis, the shaft being axially movable between a first position for fixing the lever plate in position relative to the auxiliary base and a second position for releasing the lever plate from the auxiliary base, wherein the motion conversion mechanism is disposed between the lever plate and the auxiliary base.

34. A machine tool as defined in claim 29, wherein the machine tool is a table saw, and further comprises a base, a turntable and a saw unit, the base rotatably supporting the turntable and the saw unit being vertically movable relative to the turntable for cutting the workpiece.

35. A machine tool comprising:
a table having an upper surface defining a first plane that is adapted to support a workpiece,
a fence mounted on the table and having a side surface defining a second plane, the second plane being substantially perpendicular to the first plane,
a vice disposed on the table, the vice comprising a pad that can fix the workpiece between the pad and the side surface of the fence and
means for finely adjusting a longitudinal position of the workpiece along a plane that is substantially parallel to the second plane after the workpiece has been temporarily fixed by the vice.

36. A machine tool as defined in claim 35, wherein the means for finely adjusting a longitudinal position of the workpiece comprises a shaft that is operable in a first mode to fix the workpiece between the pad and the side surface and is operable in a second mode to shift the workpiece along the fence, the shaft pivoting about a first axis in the second mode, wherein the first axis is substantially perpendicular to the upper surface of the table.

37. A machine tool as defined in claim 36, wherein the means for finely adjusting a longitudinal position of the workpiece further comprises a support member that supports the shaft, wherein the shaft is movable in the axial direction relative to the table and the shaft is pivotable about the first axis.

38. A machine tool as defined in claim 37, wherein the support member defines the first axis and the position of the first axis relative to the table is adjustable along the axial direction of the shaft.

39. A machine tool as defined in claim 38, wherein the means for finely adjusting a longitudinal position of the workpiece further comprises a thread mechanism disposed between the support member and the shaft, wherein the shaft can move in the axial direction toward and away from the fence as the shaft rotates about a shaft axis.

40. A machine tool as defined in claim 39, wherein the thread mechanism includes a threaded portion formed on the shaft and a nut engaging the threaded portion, wherein the support member further includes a retainer for retaining the nut.

41. A machine tool as defined in claim 40, wherein the nut includes a plurality of nut segments that are spaced from each other in the circumferential direction and are movable relative to the retainer in a diametrical direction of the shaft, and further including a nut shifting mechanism that is operable to shift the nut segments radially inwardly toward the shaft for engagement with the threaded shaft portion and to shift the nut segments radially outwardly away from the shaft for disengagement from the threaded shaft portion.

42. A machine tool as defined in claim 35, wherein the pad is pivotable about a second axis that is parallel to the first axis.

43. A machine tool as defined in claim 42, further comprising a biasing member disposed between the shaft and the pad so as to resiliently bias the pad toward the workpiece.

44. A machine tool as defined in claim 43, wherein the machine tool is a table saw, and further comprises a base, a turntable and a saw unit, the base rotatably supporting the turntable and the saw unit being vertically movable relative to the turntable for cutting the workpiece.

45. A machine tool as defined in claim 35, wherein the machine tool is a table saw, and further comprises a base, a turntable and a saw unit, the base rotatably supporting the turntable and the saw unit being vertically movable relative to the turntable for cutting the workpiece.

46. A machine tool as defined in claim 45, wherein the fence is fixedly attached to the table.

47. A machine tool comprising:

a table having an upper surface defining a first plane that supports a workpiece during operation of the machine tool, a vice arranged and constructed to fix the position of the workpiece during operation of the machine tool and means for finely adjusting the position of the workpiece relative to the table by pivoting about an axis that is substantially perpendicular to the first plane.

* * * * *